(12) United States Patent
Tsuchiya

(10) Patent No.: US 7,409,944 B2
(45) Date of Patent: Aug. 12, 2008

(54) INTAKE STRUCTURE FOR INTERNAL COMBUSTION ENGINE

(75) Inventor: Tomihisa Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/878,409

(22) Filed: Jul. 24, 2007

(65) Prior Publication Data

US 2008/0022960 A1     Jan. 31, 2008

(30) Foreign Application Priority Data

Jul. 31, 2006  (JP)  ............... 2006-207868
Jun. 19, 2007  (JP)  ............... 2007-161486

(51) Int. Cl.
F02D 9/10  (2006.01)
(52) U.S. Cl. ............... 123/337; 123/306; 123/308; 123/432; 123/442; 251/305
(58) Field of Classification Search ............... 123/306, 123/308, 337, 432, 442; 251/305
See application file for complete search history.

(56) References Cited

U.S. PATENT DOCUMENTS 5,806,484 A * 9/1998 Yoneyama et al. .......... 123/308
7,188,604 B2 * 3/2007 Isaji et al. ................... 123/337
2004/0226536 A1 * 11/2004 Sakai et al. ................. 123/308
2005/0155570 A1 * 7/2005 Confer et al. ............... 123/306

FOREIGN PATENT DOCUMENTS

DE    3800087       *  7/1989
JP    A 2004-124836    4/2004

* cited by examiner

Primary Examiner—T. M Argenbright
(74) Attorney, Agent, or Firm—Oliff & Berridge, PLC

(57) ABSTRACT

An intake structure for internal combustion engine includes an intake passage which is communicated with a combustion chamber of the internal combustion engine and through which air to be supplied to the combustion chamber flows; and a valve which is provided in the intake passage and which controls the airflow in the intake passage. The intake passage has a recess which is formed in the inner wall face of the intake passage and in which the valve is arranged; and a groove that is connected to the recess, at a substantially center position of the recess in a width direction of the recess, and that extends from the recess toward the downstream side of the intake passage.

9 Claims, 4 Drawing Sheets

INTAKE STRUCTURE FOR INTERNAL COMBUSTION ENGINE

INCORPORATION BY REFERENCE

The disclosure of Japanese Patent Application No. 2006-207868 filed on Jul. 31, 2006 and Japanese Patent Application No. 2007-161486 filed on Jun. 19, 2007 including the specification, drawings and abstract is incorporated herein by reference in its entirety.

BACKGROUND OF THE INVENTION

1. Field of the Invention

The invention relates generally to an intake structure for an internal combustion engine, and more specifically to an intake structure for an internal combustion engine, which includes a valve that controls the airflow.

2. Description of the Related Art

Technologies relating to an intake structure for an internal combustion engine have been developed. For example, Japanese Patent Application Publication No. 2004-124836 (JP-A-2004-124836) describes an air-intake apparatus for an internal combustion engine, which is designed to allow the gas to flow more efficiently in a cylinder without excessively reducing the opening ratio at an intake port. According to Japanese Patent Application Publication No. 2004-124836 (JP-A-2004-124836), an intake-air control valve that produces gas flows such as a tumble flow and a swirl flow in the cylinder is provided in the intake port. The intake-air control valve includes a rotating shaft connected to an actuator, and a flat plate-like valve element that is supported, at one end thereof, by the rotating shaft. When the intake-air control valve is at the opening position, the intake-air control valve is housed in a recess formed in a lower portion of the inner face of the intake port.

According to the aforementioned Japanese Patent Application Publication No. 2004-124836 (JP-A-2004-124836), when being at the opening position, the intake-air control valve is housed in the recess formed in the intake port to suppress the hindrance to the airflow in the intake port. However, if oil, fuel, water, etc. contained in the intake air accumulate in the recess, the deposits may interfere with the rotation of the rotating shaft of the intake-air control valve. This may hinder the smooth operation of the intake-air control valve, or increases the load placed on the actuator due to an increase in the torque required to operate the intake-air control valve.

SUMMARY OF THE INVENTION

The invention provides an intake structure for an internal combustion engine, which assures the proper operation of an airflow control valve.

An intake structure for an internal combustion engine according to an aspect of the invention includes an intake passage which is communicated with a combustion chamber of the internal combustion engine, and through which air to be supplied to the combustion chamber flows; and an airflow control valve which is provided in the intake passage, and which controls the airflow in the intake passage. The intake passage has a recess which is formed in an inner wall face of the intake passage and in which the airflow control valve is arranged; and a groove that is connected to the recess, at the substantially center position of the recess in the width direction of the recess, which is substantially perpendicular to the direction in which the air flows in the intake passage, the groove extending from the recess toward the downstream side of the intake passage.

With the intake structure for an internal combustion engine thus constructed, deposits that contain oil, fuel, water, etc. accumulated in the recess are efficiently discharged into the intake passage through the groove. This makes it possible to minimize the hindrance to the operation of the airflow control valve due to the accumulated deposits. A dynamic pressure is produced in the groove due to the air flow in the intake passage, and the dynamic pressure draws the deposits up from the recess. According to the aspect of the invention, the groove is connected to the recess at the substantially center position of the recess. The flow speed of the air flowing in the intake passage tends to be higher around the center of the recess than at the other area. Accordingly, the deposits accumulated in the recess are efficiently discharged into the intake passage.

In the aspect of the invention, a clearance may be left between the valve element and the bottom face of the recess. The groove may be communicated with the clearance. With the intake structure for an internal combustion engine thus constructed, when the air flow in the intake passage is not regulated by the air flow control valve, the deposits accumulated in the recess are drawn up from the clearance left between the valve element and the bottom face of the recess into the groove.

In the aspect of the invention, the airflow control valve may include a valve shaft and a valve element. The valve shaft is rotatably arranged in the recess. The valve element is connected to the valve shaft, and pivots about the valve shaft in accordance with the rotation of the valve shaft in the intake passage. Even when the valve element is housed in the recess, a portion of the groove may be downstream of the valve element. With the intake structure for an internal combustion engine thus constructed, when the valve element is housed in the recess, a negative pressure is produced due to the airflow formed around the intake passage, and the negative pressure is applied into the recess. Thus, the deposits accumulated in the recess are drawn up from the recess into the intake passage through the groove.

In the aspect of the invention, when viewed in a plane perpendicular to the direction in which the air flows in the intake passage, the cross-sectional area of the groove may be gradually reduced toward the downstream side of the intake passage. With the intake structure for an internal combustion engine thus constructed, the deposits are gradually gathered together while moving downstream through the groove. In this way, the deposits are efficiently carried downstream, and discharged into the intake passage.

In the aspect of the invention, when viewed in a plan perpendicular to the direction in which the air flows in the intake passage, a width of the groove may be gradually reduced toward the downstream side of the intake passage. Further, a first cross-section of the groove, which is taken along a first plane perpendicular to the direction in which the air flows in the intake passage, and a second cross-section of the groove, which is taken along a second plane that is downstream of the first plane and is perpendicular to the direction in which the air flows in the intake passage, may be geometrically similar. The second cross-section may be smaller in cross-section than the first cross-section. With the intake structure for an internal combustion engine thus constructed, the deposits are efficiently carried downstream and discharged into the intake passage.

In the aspect of the invention, the width of the groove may be less than the width of the recess, at the position at which the groove is connected to the recess. With the intake structure for an internal combustion engine thus constructed, the area of the groove that is formed in the inner wall of the intake passage is minimized, whereby the influence of the groove exerted on the airflow in the intake passage is suppressed.

In the aspect of the invention, the groove may have a groove bottom. The depth of the groove may be gradually reduced toward the downstream side of the intake passage. The upstream-side end of the groove bottom may be connected to the bottom face of the recess, and the downstream-side end of the groove bottom may be connected to the inner wall face of the intake passage. With the thus constructed intake structure for an internal combustion engine, it is possible to minimize the hindrance to the movement of the deposits to be discharged from the recess to the intake passage, which is likely to occur at the position at which the groove is connected to the recess and the position at which the groove is connected to the intake passage.

As described above, according to the aforementioned aspect of the invention, the intake structure for an internal combustion engine that assures proper operation of the airflow control valve is implemented.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EXAMPLE EMBODIMENT

Figure 1:
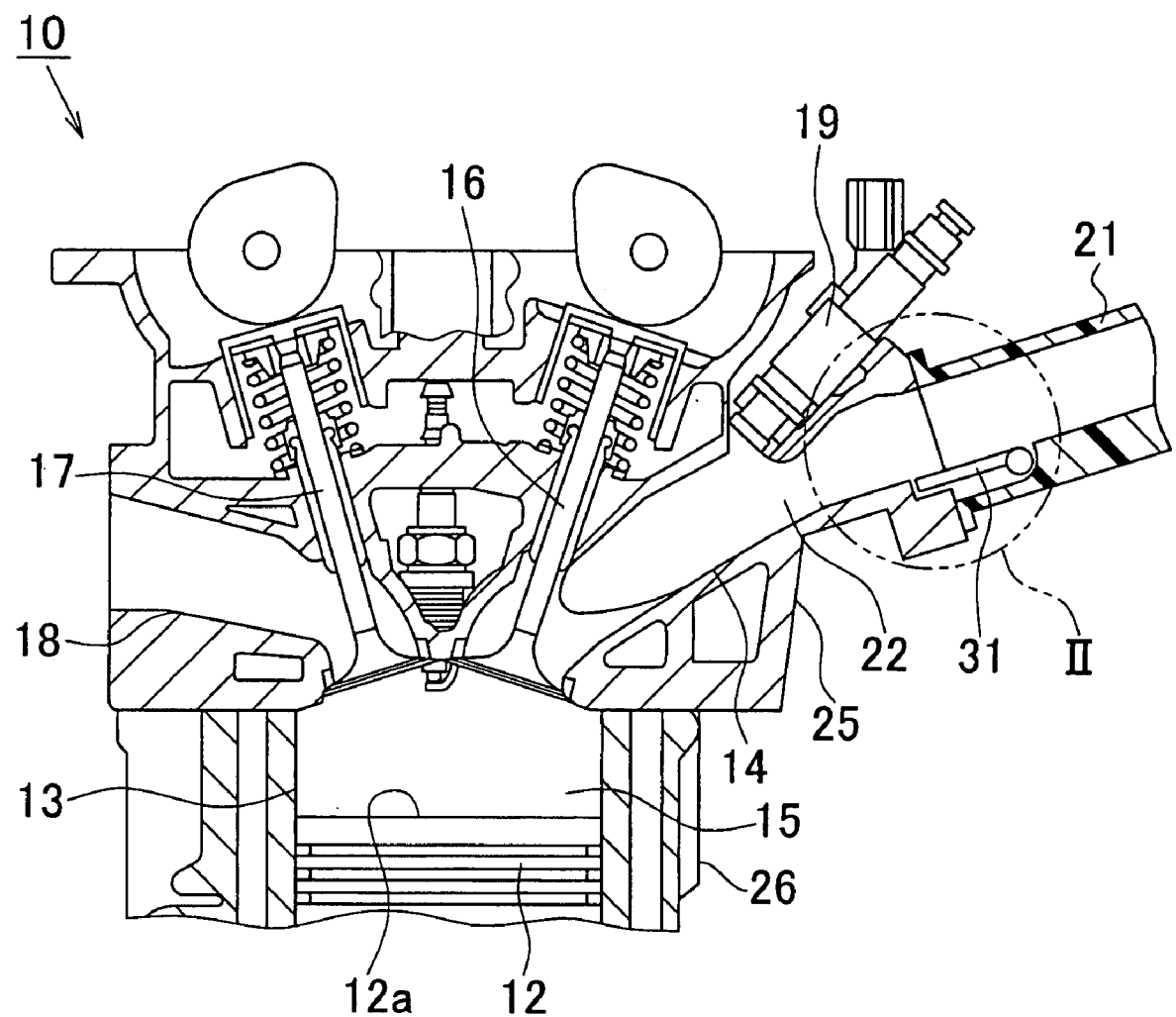
FIG. 1 is the cross-sectional view showing a gasoline engine to which an intake structure according to an embodiment of the invention is applied.

An example embodiment of the invention will be described with reference to the attached drawings. Note that, in the attached drawings referred in the description below, the same or corresponding components are denoted by the same reference numerals.

FIG. 1 is the cross-sectional view showing a gasoline engine to which an intake structure according to an embodiment of the invention is applied. A gasoline engine 10 (hereinafter referred to as an "engine 10") is an internal combustion engine mounted in a vehicle. The engine 10 is an in-line multi-cylinder engine. FIG. 1 shows the cross-section of one of the cylinders of the engine 10. Note that, the engine 10 is not limited to an in-line engine, and may be, for example, a V-type engine, a horizontally opposed engine, or a W-type engine.

The engine 10 includes a cylinder block 26 and a cylinder head 25. A plurality of cylinders 13 is formed in the cylinder block 26. The cylinder head 25 is fixed atop of the cylinder block 26. The cylinder head is made of metal, for example, an aluminum alloy.

A piston 12 is provided in each of the cylinders 13 in a manner that the piston 12 fits tightly in the cylinder 13. The piston 12 has a substantially circular top face 12a, and reciprocates in the cylinder 13. A combustion chamber 15 formed in each of the cylinders 13. The combustion chamber 15 is defined by the top face 12a, the inner face of the cylinder block 26, which defines the cylinders 13, and the cylinder head 25. The cylinder head 25 has an intake port 14 and an exhaust port 18 that are communicated with the combustion chamber 15. An intake valve 16 is provided in the intake port 14, and opens/closes to provide/shut off communication between the combustion chamber 15 and the intake port 14 at an appropriate time. Similarly, an exhaust valve 17 is provided in the exhaust port 18, and opens/closes to provide/shut off communication between the combustion chamber 15 and the exhaust port 18 at an appropriate time.

The engine 10 further includes an intake manifold 21 that is fixed to the cylinder head 25. The intake manifold 21 guides the air taken in from the outside of the vehicle to the intake port 14. The intake manifold 21 is made of a resin. Alternatively, the intake manifold 21 may be made of metal.

The intake manifold 21 and the intake port 14 form an intake passage 22 through which the air to be supplied into the combustion chamber 15 flows. The air first flows through a portion of the intake passage 22, which is formed within the intake manifold 21, then flows through the other portion of the intake passage 22, which is formed within the intake port 14, and is finally introduced into the combustion chamber 15. The intake passage 22 is provided with an injector 19 that injects fuel into the intake passage 22. The injector 19 is fixed to the cylinder head 25. The injector 19 is disposed at a position downstream of a valve 31, described later in detail, in the direction in which the air flows in the intake passage 22. It should be noted that the term "downstream" in this specification indicates "downstream" in the direction in which the air flows in the intake passage 22. Similarly, the term "upstream" in this specification indicates "upstream" in the direction in which the air flows in the intake passage 22.

Figure 2:
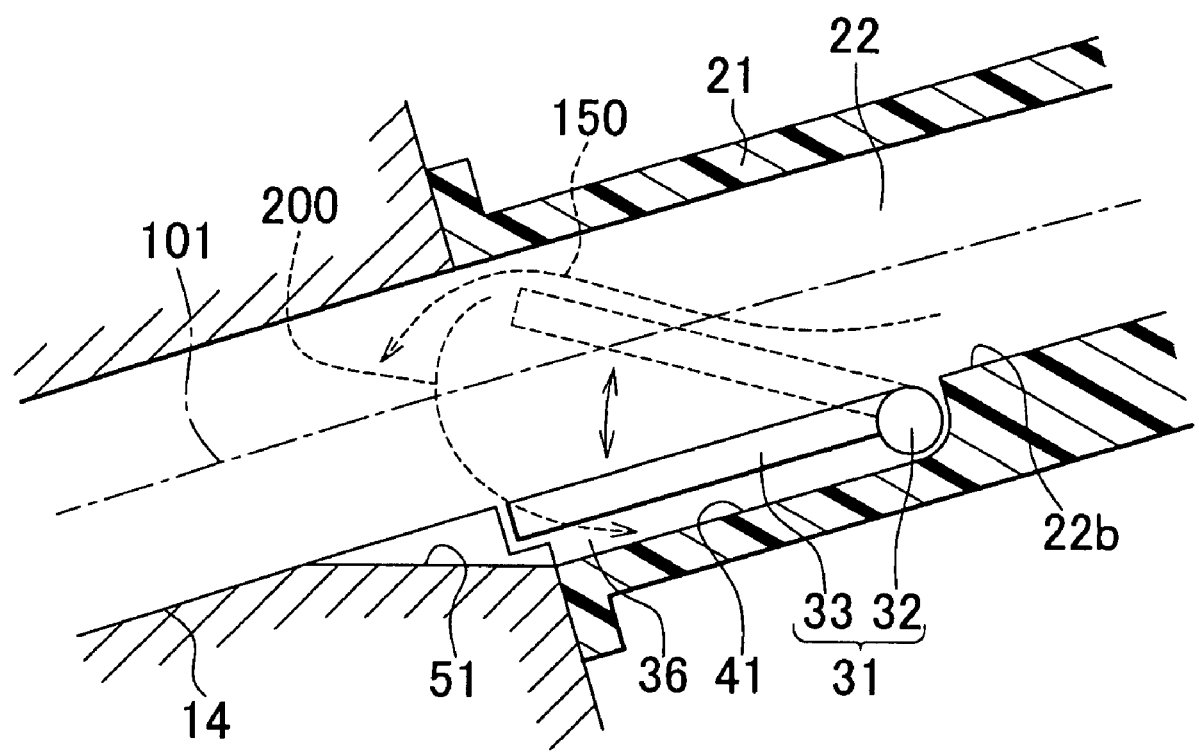
FIG. 2 is the cross-sectional view showing the portion, in FIG. 1, circled by the chain double dashed line II.

FIG. 2 is the cross-sectional view showing the portion, in FIG. 1, circled by the chain double dashed line II. As shown in FIGS. 1 and 2, the intake passage 22 extends along a central axis 101 formed of the central axis of the intake manifold 21 and the central axis of the intake port 14. The valve 31 that controls the airflow in the intake passage 22 is provided in the intake passage 22. The valve 31 actively produces a vortex flow of an air-fuel mixture in the combustion chamber 15. More specifically, the valve 31 produces a vortex flow that proceeds in the longitudinal direction of the cylinder 13, which is substantially perpendicular to the top face 12a. Namely, the valve 31 produces a tumble flow. Alternatively, the valve 31 may produces a vortex flow in the direction substantially parallel to the top face 12a. Namely, the valve 31 produces a swirl flow.

The valve 31 includes a valve shaft 32 and a valve element 33. The valve shaft 32 is rotatably provided. The valve shaft 32 is connected to an electric motor (not shown) that is controlled by, for example, an electronic control unit (ECU). A drive mechanism that rotates the valve shaft 32 is not limited to the electric motor, and may be, for example, a drive mechanism that rotates the valve shaft 32 using a negative pressure produced in the intake passage 22. The valve element 33 is connected to the valve shaft 32. The valve element 33 is a flat plate-like member. The valve element 33 extends from the valve shaft 32. In other words, one end of the valve element 33 is fixed to the valve shaft 32. The valve 31 has a cantilever support structure. The rotation of the valve shaft 32 causes the valve element 33 to pivot about the valve shaft 32, whereby the airflow in the intake passage 22 is controlled.

Figure 3:
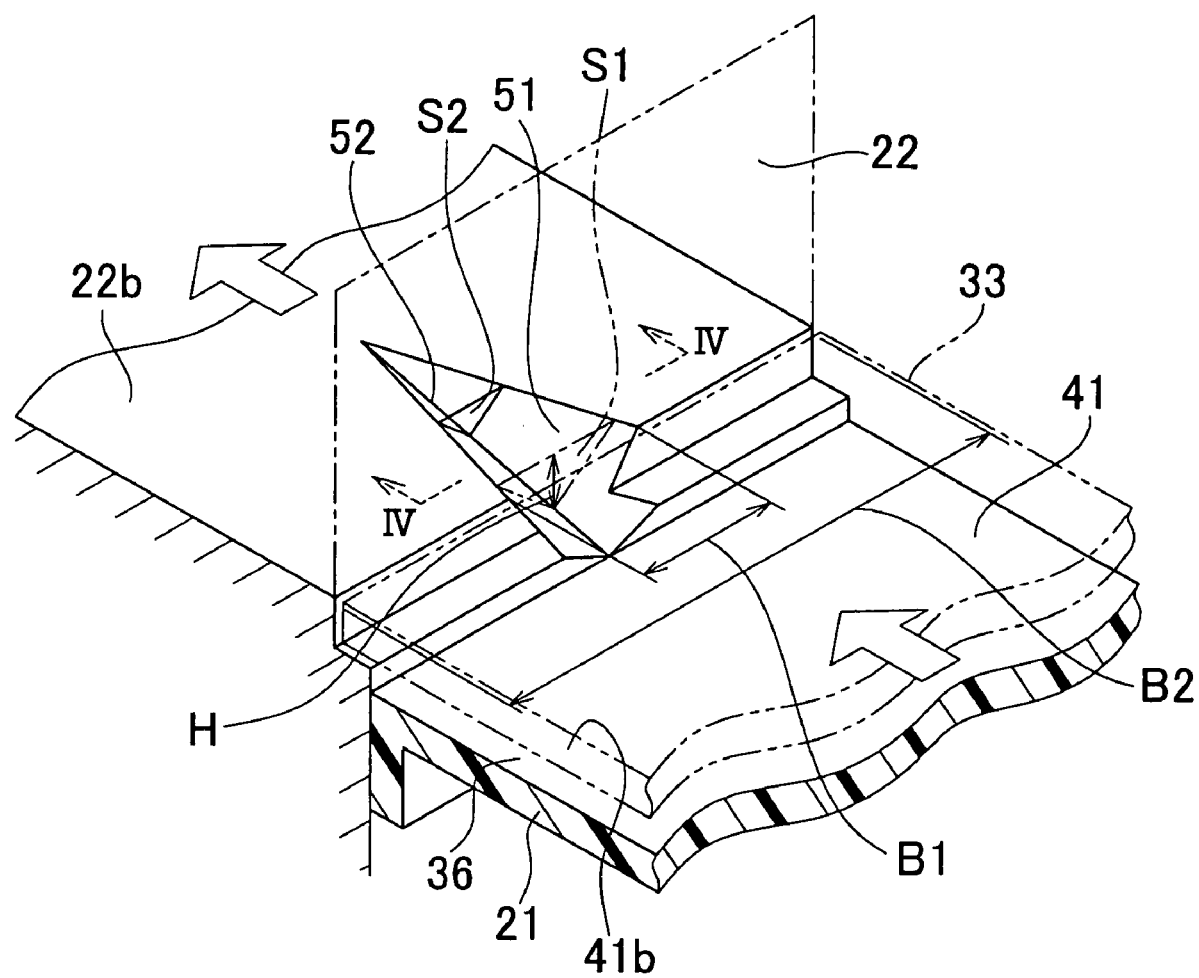
FIG. 3 is the perspective view showing the inside of an intake passage shown in FIG.

FIG. 3 is the perspective view showing the inside of the intake passage 22 in FIG. 2. As shown in FIGS. 2 and 3, the intake port 14 and the intake manifold 21 shares an inner wall face 22b that defines the intake passage 22. The inner wall face 22b smoothly extends from the upstream side toward the downstream side of the intake passage 22. The inner wall face 22b does not have any uneven spots thereon. The intake passage 22 has a substantially rectangular cross-section when viewed in a plane perpendicular to the direction in which the air flows in the intake passage 22. The cross-sectional shape of intake passage 22 is not limited to a rectangle. The cross-sectional shape of the intake passage 22 may be a circle, an oval, a shaped like a track in the athletic field (a substantially rectangular shape of which the short sides are outwardly rounded), etc.

A recess 41, which houses the valve 31, is formed in the intake passage 22. The recess 41 is formed in the inner wall face 22b. When viewed in a plane perpendicular to the direction in which air flows in the intake passage 22, the recess 41 is formed in the lower portion of the intake passage 22. The lower portion is a portion located on the lower side in the intake passage in the vertical direction. The recess 41 is shaped so as to suitably house the valve 31 therein. According to the embodiment of the invention, the recess 41 formed in the inner fall face 22b has a substantially rectangular shape, when seen from above. The recess 41 is formed astride the joint between the intake port 14 and the intake manifold 21.

The valve shaft 32 is arranged in the recess 41 such that the valve shaft 32 is positioned upstream of the valve element 33. The amount of clearance left between the wall face of the recess 41 and the valve shaft 32 is set to the smallest possible value at which the valve shaft 32 is kept from contact with the wall face of the recess 41. The valve element 33 is housed in the recess 41 in a mode where the airflow in the intake passage 22 is not regulated (hereinafter referred to as a "non-regulated airflow mode). In FIG. 2, the valve element 33 in the non-regulated airflow mode is shown by the solid line. On the other hand, in a mode where the airflow in the intake passage 22 is regulated thereinafter referred to as a "regulated airflow mode"), the valve element 33, which has been in the recess 41, pivots about the valve shaft 32 toward the position, in the intake passage 22, shown by the dotted line in FIG. 2.

The recess 41 has a bottom face 41b. The bottom face 41b and the valve element 33 face each other in the non-regulated airflow mode. In this mode, a clearance 36 is left between the bottom face 41b and the valve element 33. The distance between the bottom face 41b and the extended line of the inner wall face 22b is substantially constant from the upstream side to the downstream side. Alternatively, the distance between the bottom face 41b and the extended line of the inner wall face 22b may be gradually reduced toward downstream side. In other words, the bottom face 41b may be sloped such that the depth of the recess 41 is greatest at the uppermost-stream end of the bottom face 41b and is least at the lowermost-stream end of the bottom face 41b.

Further, a groove 51 connected to the recess 41 is formed in the intake passage 22. The groove 51 extends from the recess 41 downstream in the intake passage 22, and is connected to the downstream-side end of the recess 41. The groove 51 reaches the clearance 36. The groove 51 extends from the recess 41 to a position further downstream of the downstream-side end of the valve element 33 housed in the recess 41. Namely, even in the non-regulated airflow mode where the valve element 33 is housed in the recess 41, the groove 51 is partially exposed to the intake passage 22 directly.

Figure 4:
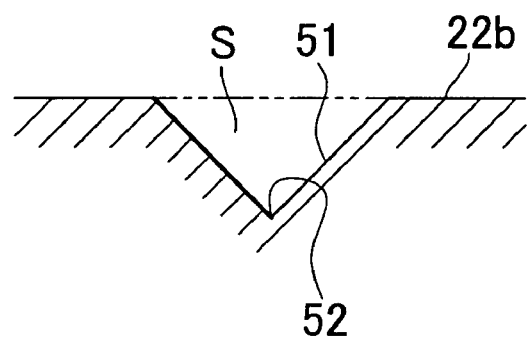
FIG. 4 is the cross-sectional view of a groove taken along the line IV-IV in FIG. 3.

FIG. 4 is the cross-sectional view of the groove 51 taken along the line IV-IV in FIG. 3. As shown in FIGS. 2 to 4, when viewed in a plane perpendicular to the direction in which the air flows in the intake passage 22, the cross-sectional area S of the groove 51 is gradually reduced toward the downstream side of the intake passage 22. The cross-sectional area S of the groove 51 is 0 at the downstream-side end of the groove 51. The groove 51 has a V-shaped cross-section.

The groove 51 has a groove bottom 52. The distance between the groove bottom 52 and the extended line of the inner wall face 22b, that is, the depth H of the groove 51, is gradually reduced toward the downstream side of the intake passage 22, and is 0 at the downstream-side end of the groove 51. The upstream-side end of the groove bottom 52 is connected to the bottom face 41b of the recess 41. Further, the downstream-side end of the groove bottom 52 is connected to the inner wall face 22b. The groove bottom 52 may be sloped upward toward the downstream side of the intake passage 22.

The width B1 of the groove 51 is less than the width B2 of the recess 41, at the position at which the groove 51 is connected to the recess 41. Note that, the width B1 of the groove 51 and the width B2 of the recess 41 are the length of the groove 51 and the length of the recess 41, respectively, in the direction perpendicular to the direction in which the air flows in the intake passage 22. With this construction, the area of the groove 51 formed in the inner wall face 22b is minimized, whereby the influence of the groove 51 exerted on the airflow in the intake passage 22 is suppressed.

When viewed in a plane perpendicular to the direction in which the air flows in the intake passage 22, the recess 41 and the groove 51 are different from each other in cross-sectional shape. In this view, the cross-sectional area S of the groove 51 is smaller than the cross-sectional area of the recess 41. The area of the groove 51 that opens on the inner wall face 22b is also smaller than the area of the recess 41 that opens on the inner wall face 22b. The position at which the groove 51 is connected to the recess 41 is substantially the center position of the recess 41 in the width direction of the groove 51 and the recess 41. Alternatively, the width B1 of the groove 51 and the width B2 of the recess 41 may be equal to each other, at the position at which the groove 51 is connected to the recess 41.

The oil, fuel, water, etc. contained in the air flowing in the intake passage 22 may be accumulated in the recess 41. In the regulated airflow mode, the valve element 33, which has been housed in the recess 41, pivots about the valve shaft 32 and moves into the intake passage 22. In this mode, the valve element 33 produces a whirl airflow that proceeds toward the recess 41 after passing above the valve element 33, that is, an airflow that first proceeds in the direction of the arrow 150 and then proceeds in the direction of the arrow 200 in FIG. 2. The whirl airflow guides the oil and water contained in the air, to be supplied to the combustion chamber 15, into the recess 41. In addition, the fuel, which is injected from the injector 19 and is supposed to flow downstream, is caught up in the whirl airflow, and then guided into the recess 41. The deposits accumulated in the recess 41 contain oxides and carbide, which are the combustion products of fuel, oil, particulate matters (PM), etc.

According to the embodiment of the invention, the groove 51 is formed in the intake passage 22. Formation of the groove 51 allows the deposits accumulated in the recess 41 to be efficiently discharged to the intake passage 22. In particular, in the non-regulated airflow mode, the air flows at a high speed near the groove 51, which produces a negative pressure.

The negative pressure thus produced forcibly draws the deposits up from the recess 41 to the intake passage 22 through the groove 51.

According to the embodiment of the invention, the groove 51 has a V-shaped cross-section, and the depth of the groove 51 is gradually reduced toward the downstream side of the intake passage 22. With this construction, the deposits are gradually gathered together while moving downstream through the groove 51. This facilitates the movement of the deposits. Further, there is no difference in level between the bottom face 41b and the groove bottom 52 and between the groove bottom 52 and the inner wall face 22b. Therefore, the movement of the deposits from the recess 41 toward the intake passage 22 is not hindered. According to the embodiment of the invention, the deposits accumulated in the recess 41 are efficiently discharged to the intake passage 22.

Figure 5A:
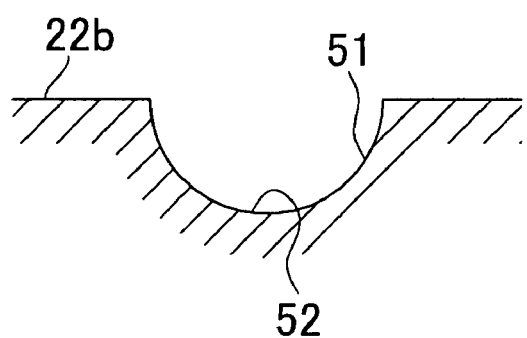
FIG. 5A is the cross-sectional view showing a modified example of the groove formed in the intake passage in FIG. 2.
Figure 5B:
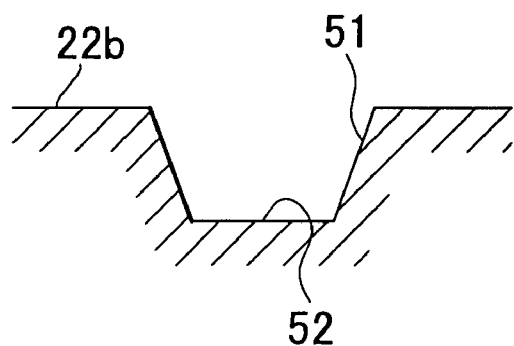
FIG. 5B is the cross-sectional view showing another modified example of the groove formed in the intake passage in FIG. 2.

FIG. 5 illustrates the sectional views showing modified examples of the groove 51 formed in the intake passage 22 shown in FIG. 2. The grooves 51 shown in FIGS. 5A and 5B are the modified examples of the groove 51 shown in FIG. 4. The groove 51 according to a modified example shown in FIG. 5A has a substantially semi-circular cross section. When viewed in a plane perpendicular to the direction in which the air flows in the intake passage 22, the wall face of the groove 51 may be curved. The groove 51 according to another modified example shown in FIG. 5B has a substantially reversed-trapezoidal cross section. The groove 51 may have a flat groove bottom 52. According to yet another modified example (not shown), a plurality of grooves 51 may be formed in the intake passage 22.

The intake structure for an internal combustion engine according to the embodiment of the invention includes the intake passage 22 and the valve 31. The intake passage 22 is communicated with the combustion chamber 15 of the gasoline engine 10 that is an internal combustion engine, and the air to be supplied to the combustion chamber 15 flows through the intake passage 22. The valve 31 is provided in the intake passage 22, and serves as an airflow control valve that controls the airflow. The intake passage 22 has the recess 41 and the groove 51. The recess 41 is formed in the inner wall face 22b of the intake passage 22, and houses the valve 31 therein. The groove 51 is connected to the recess 41, and extends downstream from the recess 41. The position at which the groove 51 is connected to the recess 41 is substantially the center position of the recess 41 in the width direction of the groove 51 and the recess 41, that is, the direction perpendicular to the direction in which the air flows in the intake passage 22.

The clearance 36 is left between the valve element 33 and the bottom face 41b of the recess 41. The groove 51 is communicated with the clearance 36.

When viewed in a plane perpendicular to the direction in which the air flows in the intake passage 22, the width of the groove 51 is gradually reduced toward the downstream side of the intake passage 22.

The first cross-section S1 of the groove 51, which is taken along the first plane perpendicular to the direction in which the air flows in the intake passage 22, and the second cross-section S2 of the groove 51, which is taken along the second plane that is downstream of the first plane and is perpendicular to the direction in which the air flows in the intake passage 22, are geometrically similar. The second cross-section S2 is smaller in cross-section than the first cross-section S1.

With the intake structure for an internal combustion engine according to the embodiment of the invention, the deposits accumulated in the recess 41 are effectively discharged into the intake passage 22. This makes it possible to avoid hindrance to the rotation of the valve shaft 32 due to the accumulated deposits. It is therefore possible to keep the valve 31 operating properly. In addition, setting the power used to drive the valve 31 to a greater value in anticipation of accumulation of the deposits is no longer required. As a result, the intake structure is produced at a lower cost.

The intake structure for an internal combustion engine according to the embodiment of the invention includes the intake passage and the airflow control valve. The intake passage is communicated with the combustion chamber of the internal combustion engine, and the air to be supplied to the combustion chamber flows through the intake passage. The airflow control valve is provided in the intake passage, and controls the airflow. The intake passage has the recess and the groove therein. The recess is formed in the inner wall face of the intake passage, and houses the airflow control valve therein. The groove is connected to the recess, and extends downstream from the recess.

The airflow control valve may include the valve shaft and the valve element. The valve shaft is rotatably arranged in the recess. The valve element is connected to the valve shaft, and pivots about the valve shaft in accordance with the rotation of the valve shaft in the intake passage. In the non-regulated airflow mode, the valve element is housed in the recess. Even when the airflow control valve is housed in the recess, the groove is partially exposed to the intake passage directly. With the thus constructed intake structure for an internal combustion engine, in the non-regulated airflow mode, a negative pressure produced by the airflow in the intake passage, which is formed near the groove, is applied into the recess. The negative pressure draws the deposits accumulated in the recess up to the intake passage through the groove.

When viewed in a plane perpendicular to the direction in which the air flows in the intake passage, the cross-sectional area of the groove is gradually reduced toward the downstream side of the intake passage. With this construction, the deposits are gradually gathered together while moving downstream through the groove. This makes it possible to efficiently carry the deposits downstream. As a result, the deposits are efficiently discharged to the intake passage.

The width of the groove is less than the width of the recess, at the position at which the groove is connected to the recess. With the thus constructed intake structure for an internal combustion engine, the area of the groove that is formed in the inner wall face of the intake passage is minimized, whereby the influence of the groove exerted on the airflow in the intake passage is suppressed.

The groove may have the groove bottom. The distance between the extended line of the inner wall face of the intake passage and the groove bottom is gradually reduced toward the downstream side of the intake passage. The upstream-side end of the groove bottom is connected to the bottom face of the recess, and the downstream-side end of the groove bottom is connected to the inner wall face of the intake passage. With the thus constructed intake structure for an internal combustion engine, it is possible to minimize the hindrance to the movement of the deposits to be discharged from the recess to the intake passage, which is likely to occur at a position at which the groove is connected to the recess and a position at which the groove is connected to the intake passage.

While the invention has been described with reference to an example embodiment thereof, it should be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the scope of the invention.

What is claimed is:

1. An intake structure for an internal combustion engine, comprising:
    an intake passage which is communicated with a combustion chamber of the internal combustion engine, and through which air to be supplied to the combustion chamber flows; and
    an airflow control valve which is provided in the intake passage, and which controls an airflow in the intake passage, wherein
    the intake passage has a recess which is formed in an inner wall face of the intake passage and in which the airflow control valve is arranged; and a groove that is connected to the recess, at a substantially center position of the recess in a width direction of the recess, which is substantially perpendicular to a direction in which the air flows in the intake passage, the groove extending from the recess toward a downstream side of the intake passage.

2. The intake structure for an internal combustion engine according to claim 1, wherein:
    the airflow control valve includes a valve shaft that is rotatably arranged in the recess, and a valve element that is connected to the valve shaft and that pivots about the valve shaft in the intake passage in accordance with rotation of the valve shaft; and
    a portion of the groove is downstream of the valve element housed in the recess.

3. The intake structure for an internal combustion engine according to claim 1, wherein:
    a clearance is left between the valve element and a bottom face of the recess, and the groove is communicated with the clearance.

4. The intake structure for an internal combustion engine according to claim 1, wherein:
    when viewed in a plane perpendicular to the direction in which the air flows in the intake passage, a cross-sectional area of the groove is gradually reduced toward the downstream side of the intake passage.

5. The intake structure for an internal combustion engine according to claim 1, wherein:
    the groove has a groove bottom;
    a depth of the groove is gradually reduced toward the downstream side of the intake passage; and
    an upstream-side end of the groove bottom is connected to the bottom face of the recess, and a downstream-side end of the groove bottom is connected to the inner wall face of the intake passage.

6. The intake structure for an internal combustion engine according to claim 1, wherein:
    when viewed in a plane perpendicular to the direction in which the air flows in the intake passage, a width of the groove is gradually reduced toward the downstream side of the intake passage.

7. The intake structure for an internal combustion engine according to claim 1, wherein:
    a first cross-section of the groove, which is taken along a first plane perpendicular to the direction in which the air flows in the intake passage, and a second cross-section of the groove, which is taken along a second plane that is downstream of the first plane and that is perpendicular to the direction in which the air flows in the intake passage, are geometrically similar, and a cross-sectional area of the second cross-section is smaller than a cross-sectional area of the first cross-section.

8. The intake structure for an internal combustion engine according to claim 7, wherein:
    the width of the groove is less than a width of the recess at a position at which the groove is connected to the recess.

9. The intake structure for an internal combustion engine according to claim 7, wherein:
    the width of the groove is equal to a width of the recess at a position at which the groove is connected to the recess.

* * * * *